(12) United States Patent
Shah (10) Patent No.: US 9,990,217 B2
(45) Date of Patent: Jun. 5, 2018

(54) HYPERVISOR PRINTER EMULATION FOR VIRTUAL MACHINES

(75) Inventor: Amit Shah, Pune (IN)

(73) Assignee: Red Hat, Inc., Raleigh, NC (US)

( * ) Notice: Subject to any disclaimer, the term of this patent is extended or adjusted under 35 U.S.C. 154(b) by 249 days.

(21) Appl. No.: 13/484,575

(22) Filed: May 31, 2012

(65) Prior Publication Data
US 2013/0326511 A1 Dec. 5, 2013

(51) Int. Cl.
*G06F 9/455* (2018.01)
(52) U.S. Cl.
CPC .......... *G06F 9/45558* (2013.01); *G06F 2009/45579* (2013.01)
(58) Field of Classification Search
None
See application file for complete search history.

(56) References Cited

U.S. PATENT DOCUMENTS

| 5,903,716 | A  | * | 5/1999 | Kimber et al. | ............. | 358/1.13 |
| 6,115,132 | A  | * | 9/2000 | Nakatsuma et al. | ........ | 358/1.14 |
| 6,542,252 | B2 | * | 4/2003 | Brossman et al. | ........... | 358/1.13 |
| 6,798,530 | B1 | * | 9/2004 | Buckley | ............... | G06F 3/1204 358/1.1 |
| 7,206,082 | B2 | * | 4/2007 | Barry | .................... | B41J 29/393 358/1.13 |
| 7,286,974 | B2 | * | 10/2007 | Siahaan | ................ | G06F 3/1284 703/21 |
| 8,213,033 | B2 | * | 7/2012 | Choi | ..................... | G06F 3/1204 358/1.1 |
| 8,341,270 | B2 | * | 12/2012 | Mazzaferri et al. | .......... | 709/227 |
| 8,508,598 | B2 | * | 8/2013 | Louks | ............... | H04N 1/00132 348/207.2 |
| 2002/0051194 | A1 | * | 5/2002 | Sakura | .................. | G06F 3/1288 358/1.15 |
| 2002/0143842 | A1 | * | 10/2002 | Cota-Robles et al. | ........... | 709/1 |
| 2003/0033368 | A1 | * | 2/2003 | Tominaga | ..................... | 709/203 |
| 2003/0084132 | A1 | * | 5/2003 | Ohta | ............................ | 709/221 |
| 2003/0103236 | A1 | * | 6/2003 | Kato | ..................... | G06F 3/1204 358/1.15 |
| 2003/0202210 | A1 | * | 10/2003 | Anderson | .............. | G06K 15/02 358/1.18 |

(Continued)

OTHER PUBLICATIONS

Microsoft, "How to print from a windows-based virtual machine in virtual PC" Sep. 10, 2011; (Microsoft_09102011.pdf; pp. 1-4).*

(Continued)

*Primary Examiner* — Hiren Patel
(74) *Attorney, Agent, or Firm* — Lowenstein Sandler LLP (57) ABSTRACT

A virtual machine manager (VMM) provides an emulated printer to a guest operating system. The virtual machine manager is configured to receive a printer mechanism type, receive an output type, and configure the emulated printer according to the printer type, printer mechanism type, and output type. The VMM, in one embodiment, also provides a virtual communication channel over which a guest operating system may identify and communicate with the emulated printer. The guest operating system installs a printer driver corresponding to the emulated printer, prints an object to the emulated printer via the virtual communication bus, and the VMM creates a print image of the object before communicating the print image with a target destination.

14 Claims, 5 Drawing Sheets

(56) References Cited

U.S. PATENT DOCUMENTS

| | | | |
|---|---|---|---|
| 2004/0119999 A1* | 6/2004 | Kogure | G06K 15/02 358/1.13 |
| 2005/0111024 A1* | 5/2005 | Ferlitsch | G06F 3/1206 358/1.13 |
| 2006/0107269 A1* | 5/2006 | Bantz | G06F 9/5077 719/310 |
| 2006/0253824 A1* | 11/2006 | Iizuka | 716/11 |
| 2007/0038997 A1* | 2/2007 | Grobman | G06F 21/10 718/1 |
| 2007/0089111 A1* | 4/2007 | Robinson | G06F 21/53 718/1 |
| 2007/0121147 A1* | 5/2007 | Corona et al. | 358/1.15 |
| 2007/0165258 A1* | 7/2007 | Farrell | G06F 3/1205 358/1.13 |
| 2007/0180448 A1* | 8/2007 | Low et al. | 718/1 |
| 2007/0285710 A1* | 12/2007 | Cranitch | G07B 17/00024 358/1.15 |
| 2007/0300221 A1* | 12/2007 | Hartz et al. | 718/1 |
| 2008/0077914 A1* | 3/2008 | Sando | 717/174 |
| 2008/0102892 A1* | 5/2008 | Louks et al. | 455/557 |
| 2008/0192296 A1* | 8/2008 | Ferlitsch | G06F 3/1211 358/1.16 |
| 2008/0246990 A1* | 10/2008 | Brockhurst | G06F 3/1205 358/1.15 |
| 2008/0294976 A1* | 11/2008 | Rosenberg | G06F 17/30011 715/209 |
| 2009/0007151 A1* | 1/2009 | Sheehan | G06F 3/1224 719/321 |
| 2009/0049453 A1* | 2/2009 | Baran | G06F 9/544 719/313 |
| 2009/0168100 A1* | 7/2009 | Huster | 358/1.15 |
| 2009/0245521 A1* | 10/2009 | Vembu | G06F 21/606 380/279 |
| 2010/0138208 A1* | 6/2010 | Hattori | G06F 9/45558 703/25 |
| 2010/0180274 A1* | 7/2010 | Cherian | G06F 9/45558 718/1 |
| 2011/0013214 A1* | 1/2011 | Kaida | G06F 3/1205 358/1.13 |
| 2011/0013217 A1* | 1/2011 | Tang | H04N 1/00244 358/1.14 |
| 2011/0188064 A1* | 8/2011 | Awata | 358/1.13 |
| 2011/0292946 A1* | 12/2011 | Flinta | G06F 9/455 370/395.53 |
| 2012/0011263 A1* | 1/2012 | Kamay | H04L 49/9057 709/229 |
| 2012/0044538 A1* | 2/2012 | Lin | G06F 3/1208 358/1.15 |
| 2012/0120437 A1* | 5/2012 | Nanaumi | G06F 3/1205 358/1.15 |
| 2012/0167080 A1* | 6/2012 | Vilayannur | G06F 3/0608 718/1 |
| 2012/0274979 A1* | 11/2012 | Uchida | H04L 69/08 358/1.15 |
| 2012/0304168 A1* | 11/2012 | Raj Seeniraj | G06F 9/4445 718/1 |
| 2013/0094045 A1* | 4/2013 | Nakata | G06F 3/1204 358/1.13 |
| 2013/0263279 A1* | 10/2013 | Kobashi | G06F 21/10 726/26 |

OTHER PUBLICATIONS

IPDS Printing Solutions Inc.; "Virtual IPDS Printer"; Jul. 17, 2011; (Virtual_IPDS_Printer_07172011.pdf; pp. 1-3).*

"Printing from DOS to LPT", aSwlt Srl: Mail, Print for DOS, Windows, 3 pages (Archived on Nov. 2, 2011) http://www.freedownloadscenter.com/Business/Printer_Tools/_Swlt_Printfil.html.

* cited by examiner

HYPERVISOR PRINTER EMULATION FOR VIRTUAL MACHINES

TECHNICAL FIELD

The embodiments of the disclosure relate generally to virtual machine systems and, more specifically, relate to a mechanism for hypervisor printer emulation for virtual machines.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM. However, I/O with directly connected devices, such as printers, may be problematic due to the number of virtual machines on a host, or due to restricted print privileges afforded to the virtual machine.

BRIEF DESCRIPTION OF THE DRAWINGS

Embodiments of the present disclosure are illustrated by way of example, and not by way of limitation, and can be more fully understood with reference to the following detailed description when considered in connection with the figures in which.

DETAILED DESCRIPTION

Described herein are methods and systems for emulating a physical printer in a hypervisor or virtual machine manager. Embodiments of the present disclosure provide a virtual machine manager (VMM) configured to receive a printer mechanism type, receive an output type, and configure the emulated printer according to the printer type, printer mechanism type, and output type.

The VMM, in one embodiment, also provides a virtual communication channel over which a guest operating system may identify and communicate with the emulated printer. The guest operating system installs a printer driver corresponding to the emulated printer, prints an object to the emulated printer via the virtual communication channel, and the VMM creates a print image of the object before communicating the print image with a target destination.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "establishing", "identifying", "providing", "storing", "retrieving", "communicating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Figure 1:
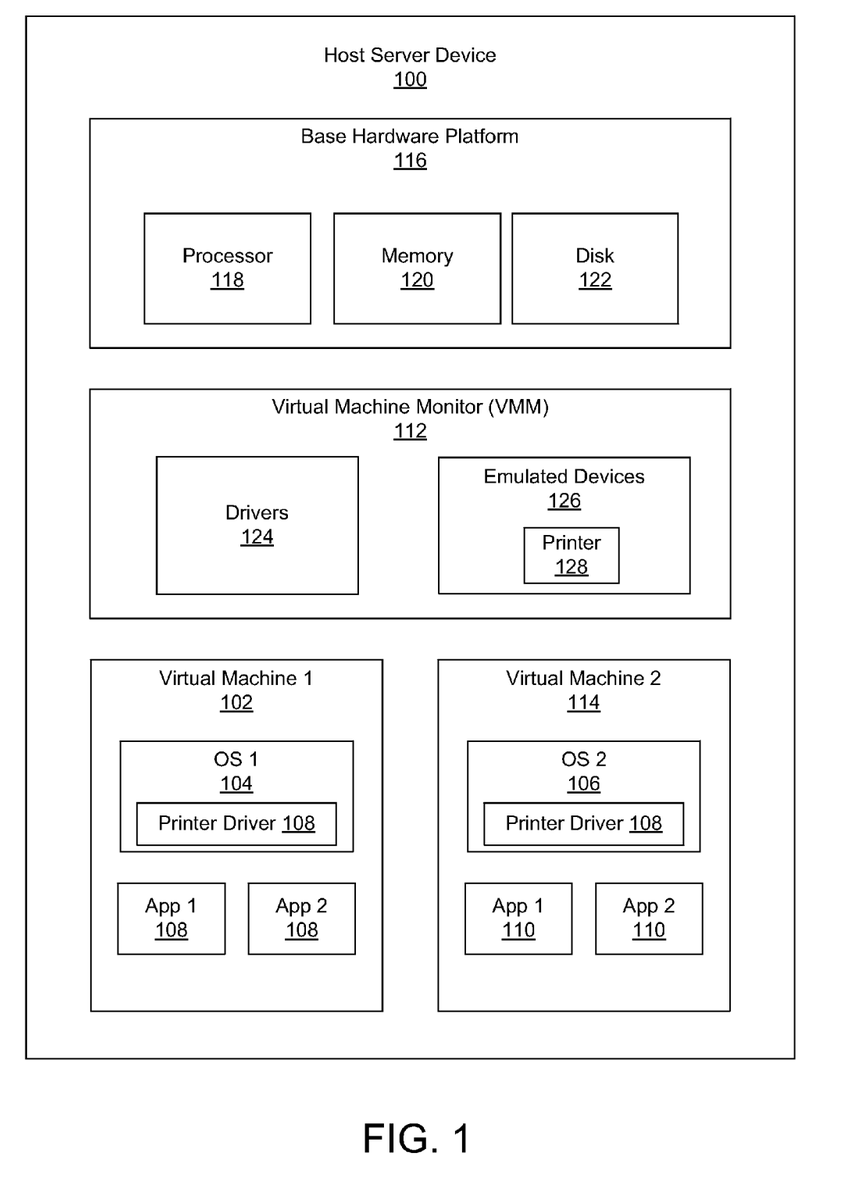
FIG. 1 illustrates one embodiment of a VM host server device, which employs a virtual-machine monitor (VMM) to perform printer emulation under embodiments of the present invention.

FIG. 1 illustrates one embodiment of a VM host server device 100, which employs a virtual-machine monitor (VMM) 112 to perform printer emulation. In one embodiment, the host server device 100 includes a base platform hardware 116 comprising a computing platform, which may be capable, for example, of executing an operating system (OS) or a virtual-machine monitor (VMM), such as VMM 112. In some embodiments, the base hardware platform 116 may include a processor 118, a memory device 120, a disk 122, network devices, drivers, and so on.

The VMM monitor 112 enables the implementation of virtual machines (VM) 102, 114. The VMs 102, 114 include operating systems 104, 106 (referred to as a guest operating system) and execute application programs 108, 110. The host server device 100 allocates a certain amount of its resources to each of the virtual machines 102, 113, and multiplexes the underlying hardware platform among the virtual machines 102, 114. Each virtual machine 102, 114 is then able to use the allocated resources to execute its guest operating system and applications.

The VMM 112 emulates the underlying hardware of the host server device 100, making the use of the virtual machine transparent to the guest operating systems 104, 106 and the user of the VMs 102, 114. The host server device 100 may manage (e.g., create/remove virtual machines, shut down virtual machines), monitor (e.g., monitor system resources used by hosts and/or virtual machines), configure (e.g., change hardware, software and/or guest operating systems on virtual machines), and/or control the virtual machines 102, 114.

The VMM 112 manages access to the physical devices from the VMs 102, 114 by translating calls to emulated devices 126 into calls to the physical devices. As such, a single physical device may be shared among multiple virtual machines or guest operating systems 104, 106. The VMM 112 may also be referred to as a hypervisor, a kernel-based hypervisor (e.g., Kernel-based VM (KVM)), or a host OS.

The VMM 112 shares the physical devices (e.g., processor 118, memory 120, disk 122, etc.) of the base hardware platform 116 with the VMs 102, 114 by either emulating a physical device, or allowing direct access to a physical device. The VMM 112, in one embodiment, is configured with drivers 124 for allowing the VMM 112 to communicate with the physical devices of the base hardware platform 116. The drivers 124 communicate with the physical devices through a computer bus or other communication subsystem coupled with the base hardware platform 116. The drivers 124 may invoke routines in the application or operating system that initiated the call to the base hardware platform 116.

The VMM 112, in one embodiment, includes emulated devices 126 that may or may not be associated with the physical devices of the base hardware platform 116. For example, the emulated devices 126 may include emulated processors, memory, and a disk. The VMM 112, in one embodiment, is configured to translate requests from the VMs 102, 114 to emulated devices 126 into requests to the base hardware platform 116 via the drivers 124.

In one embodiment, the VMM 112 is configured to emulate a device that is not physically present in the base hardware platform 116, such as a printer 128. The VMM 112 is configured to present the printer 128 to the VMs 102, 114 as if the printer 128 were physically coupled with a communication bus of the VM 102, 114. One example of a virtual communication bus is a virtual USB connection. In another embodiment, the VMM 112 is configured to emulate other printer communication busses including, but not limited to, RS-232, EIA-422, parallel, a hypervisor-specific bus, and FireWire™. As such, the guest operating systems 104, 106 may detect the printer 128 and automatically install a printer driver 108 for communicating with the printer 128.

The emulated printer 128 is a software representation of a particular variant of a printer, or alternatively, a generic PS or PCL printer. For example, the VMM 112 may be configured to provide an emulated printer 128 of the well-known Hewlett Packard LaserJet 4000. Alternatively, the VMM 112 is configured to present the printer 128 as a generic printer coupled with a virtual USB bus attached with the VMs 102, 114. As is known to those of skill in the art, many operating systems are pre-configured with printer drivers for many printers so that a user need only connect a printer to the operating system and have the printer configured automatically. Using a popular printer or a generic printer ensures that the guest operating system is pre-configured with the proper driver without needing any configuration by the user.

As such, the guest OS 104, 106 will see either a generic printer capable of handling generic printer commands, or will see a real printer (e.g., a specific model from a specific company) with the device emulation written according to the real printer's specification. The emulated printer 128 is configured to save as a file any print job sent from the guest operating systems 104, 106. In one embodiment, the printer 128 is configured to print to PDF any received print job and communicate the PDF with a target destination. For example, the printer 128 may be configured to email the PDF to a recipient or store the PDF on a storage device that may or may not be accessible to the VMs 102, 114. The target destination, in one embodiment, includes, but is not limited to, a network storage device, a local storage device, a communication device (e.g., fax machine), email server, or a physically connected local or network printer.

In another embodiment, any print job the guest operating systems 104, 106 sends can be saved on the host server device 100 as PDF files, or other file types. This allows for, beneficially, the testing of printing services in the guest operating systems, testing of print drivers, and enhanced print privileges due to security considerations.

Figure 2:
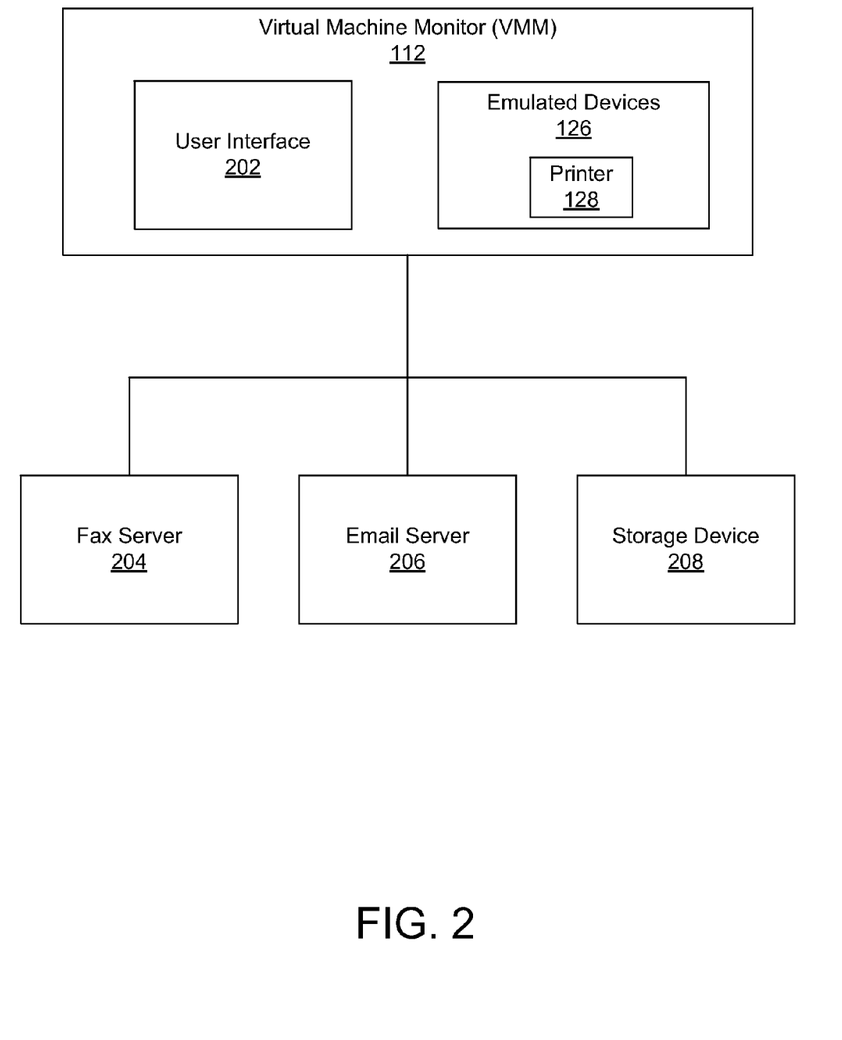
FIG. 2 illustrates a block diagram of the VMM usable under embodiments of the present invention.

FIG. 2 illustrates a block diagram of the VMM 112 usable under embodiments of the present invention. The VMM 112, as described above, is configured to provide emulated devices 126 including the emulated printer 128. The user input may be received directly from a user through the user interface 202, or alternatively, the user input 202 may determine the user preferences via an initiation or configuration file. The user interface 202, as one of skill in the art will recognize, may be a command line interface or a graphical user interface implemented in conjunction with the VMM 112. The VMM 112 also emulates a communication bus that is usable by the VM of FIG. 1. The communication bus enables print jobs to be sent from the guest operating system 104, 106.

In one embodiment, the VMM 112 is configured with a user interface for receiving user preferences related to the emulated printer 128. Examples of user preferences include, but are not limited to, the type of printer to be emulated, the print mechanism to be implemented, and the output type of the printer 128.

The user interface 202 is configured to receive input regarding the type of printer to be emulated. In one embodiment, the type of printer to be emulated is a manufacturer-specific printer. Examples include printers in the HP Laser-Jet series, or any other specific printer. In another embodiment, the user interface 202 is configured to receive, as the printer type, a generic printer capable of receiving generic printer commands.

In one embodiment, the user interface 202 is configured to identify a desired print mechanism. Examples of print mechanisms suitable for use in the present disclosure include, but are not limited to, printing via a string of characters, via a bitmapped image, via a vector image, or via PostScript® (PS) or PCL. The print mechanism may be selected according to user preference. Alternatively, the VMM 112 may select the print mechanism based on the type of object to be printed and the available emulated printer 128. The user interface 202 is also configured to receive instructions related to a desired output type. Examples include, but are not limited to, saving the object to be printed as another file format (e.g., PDF, plain text, etc.), document handling (e.g., handling multiple documents and saving the multiple documents into a single document), saving a document in a non-editable format, sending the object to a fax server, and converting an object into a platform-independent format.

The present disclosure is described hereinafter with reference to flowchart and/or block diagram illustrations of methods, systems, and computer program products according to an embodiment of the disclosure. It will be understood that each block of the flowchart and/or block diagram illustrations, and combinations of blocks in the flowchart and/or block diagram illustrations, may be implemented by processing logic. The processing logic may comprise hardware (circuitry, dedicated logic, etc.), software (such as is run on a general purpose computer system or a dedicated machine), or a combination of both. These software instructions, or other computer program instructions, may be provided to a processor of a general purpose computer, special purpose computer, or other programmable data processing apparatus to produce the processing logic, such that the instructions, which execute via the processor of the computer or other programmable data processing apparatus, implement the functions specified in the flowchart and/or block diagram block or blocks.

Figure 3:
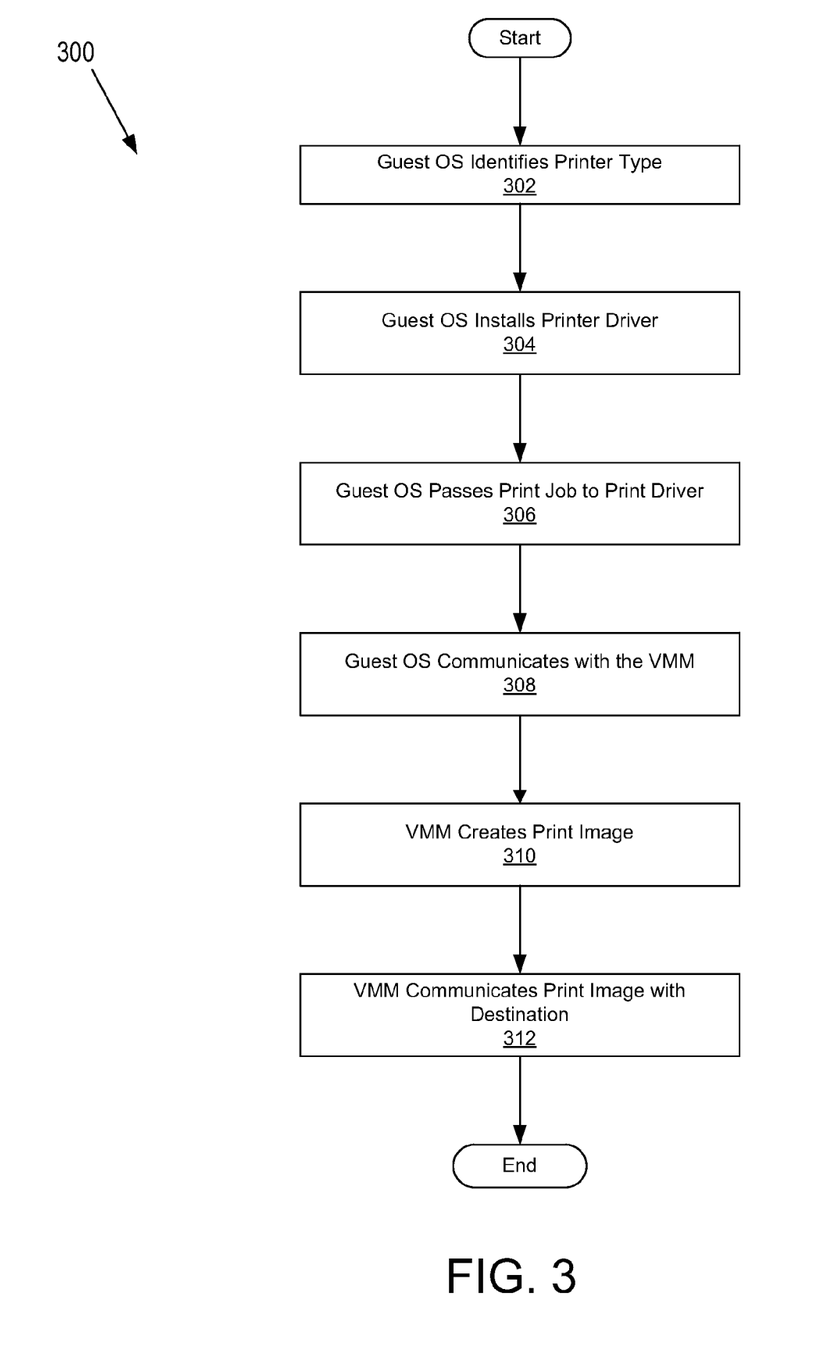
FIG. 3 illustrates a flow diagram of a method for detecting and using an emulated printer under embodiments of the present invention.

FIG. 3 illustrates a flow diagram of a method 300 for detecting and using an emulated printer under embodiments of the present invention. The method 300 is performed by processing logic that may comprise hardware (circuitry, dedicated logic, etc.), software (such as is run on a general purpose computer system or a dedicated machine), or a combination of both. In one embodiment, the method is performed by a guest operating system and a VMM (e.g., OS 104, and VMM 112 of FIG. 1). The method 300 starts and processing logic, at block 302, identifies a printer. The processing logic, in one embodiment, identifies a manufacturer specific printer and installs, at block 304, the appropriate printer driver. In another embodiment, the processing logic identifies a generic printer capable of receiving generic printing commands. Examples include, but are not limited to, generic USB or LPT printers.

At block 306 the processing logic passes a print job to the print driver which communicates over the virtual communication bus with the emulated printer. As described previously, examples of virtual communication busses include, but are not limited to, USB, parallel, Ethernet, FireWire, etc.

The processing logic then, at block 308, communicates the print job with the emulated printer 128 of the VMM 112. At block 310 the processing logic creates a print image 310. In one embodiment, the processing logic creates a print image by converting the print job into a file such as a PDF file or other document. Other examples of the processing logic creating a print image include converting multiple documents and saving the multiple documents into a single document, saving a document in a non-editable format, and converting an object into a platform-independent format.

At block 312, the processing logic communicates the print image with a target destination. In one embodiment, the processing logic communicates the print image with a target destination by sending the object to a fax server or email server. Alternatively, the processing logic stores the print image on a local or network accessible storage device, at which point the method 300 ends.

Figure 4:
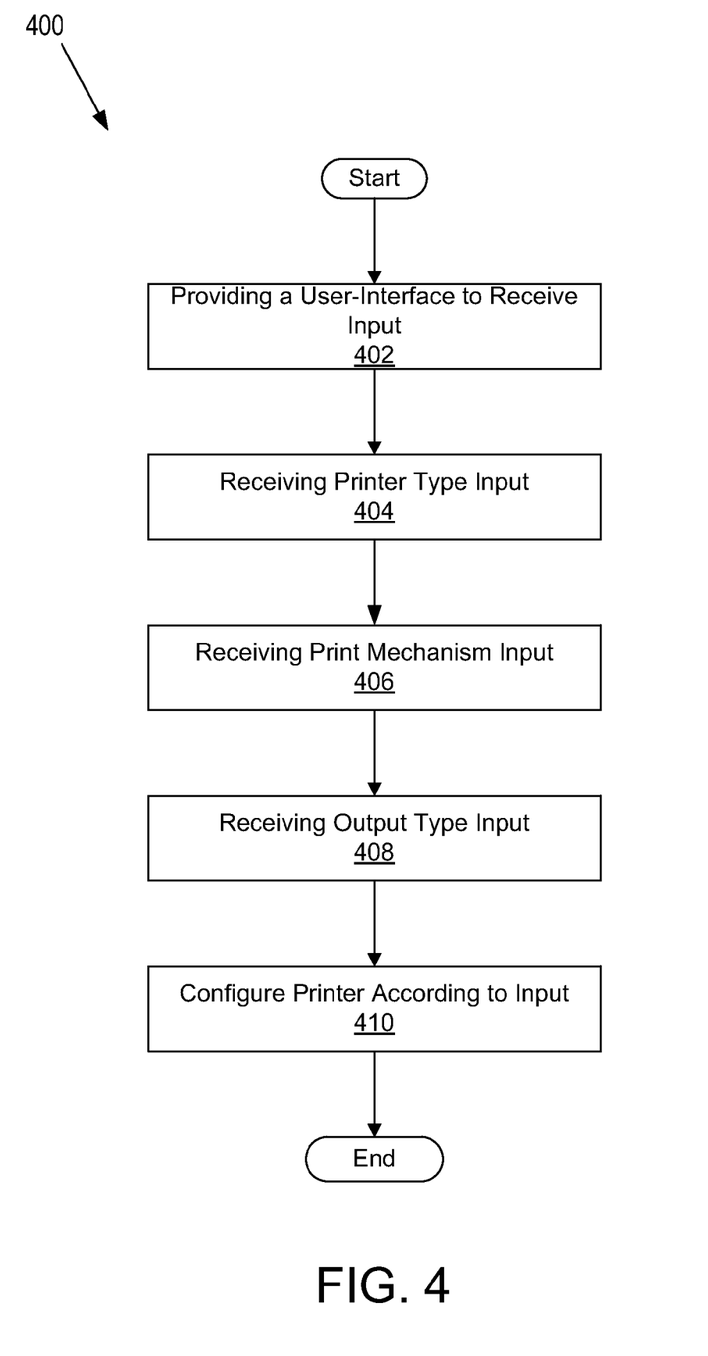
FIG. 4 illustrates a flow diagram of a method for configuring an emulated printer under embodiments of the present invention.

FIG. 4 illustrates a flow diagram of a method 400 for configuring an emulated printer under embodiments of the present invention. The method 300 is performed by processing logic that may comprise hardware (circuitry, dedicated logic, etc.), software (such as is run on a general purpose computer system or a dedicated machine), or a combination of both. In one embodiment, the method is performed by a VMM (e.g., VMM 112 of FIG. 1). In one embodiment, the method 400 starts and the processing logic, at block 402, provides a user interface to receive input related to emulated printer preferences. Examples of user preferences include, but are not limited to, the type of printer to be emulated, the print mechanism to be implemented, and the output type of the printer 128. The processing logic provides a user interface capable of receiving graphical input (e.g., via a graphical user interface), or textual input (e.g., via a command line interface). In an alternative embodiment, the processing logic receives the input from a configuration or initiation file.

At block 404, the processing logic receives input regarding the type of printer to be emulated. In one embodiment, the type of printer to be emulated is a manufacturer-specific printer. Examples include ink or laser based printers from Epson, Canon, HP, etc., or any other specific printer. In another embodiment, the processing logic is configured to receive, as the printer type, a generic printer type capable of receiving generic printer commands.

At block 406, the processing logic receives a desired print mechanism from a user. Examples of print mechanisms suitable for use in the present disclosure include, but are not limited to, printing via a string of characters, via a bitmapped image, via a vector image, or via PostScript (PS) or PCL. The print mechanism may be selected according to user preference. Alternatively, the processing logic may select the print mechanism based on the type of object to be printed and the available emulated printer 128.

At block 408, the processing logic receives instructions related to a desired output type. Examples include, but are not limited to, saving the object to be printed as another file format (e.g., PDF, plain text, etc.), document handling (e.g., handling multiple documents and saving the multiple documents into a single document), saving a document in a non-editable format, sending the object to a fax server, and converting an object into a platform-independent format. At block 410, the VMM configures and establishes an emulated printer according to the above received inputs.

Figure 5:
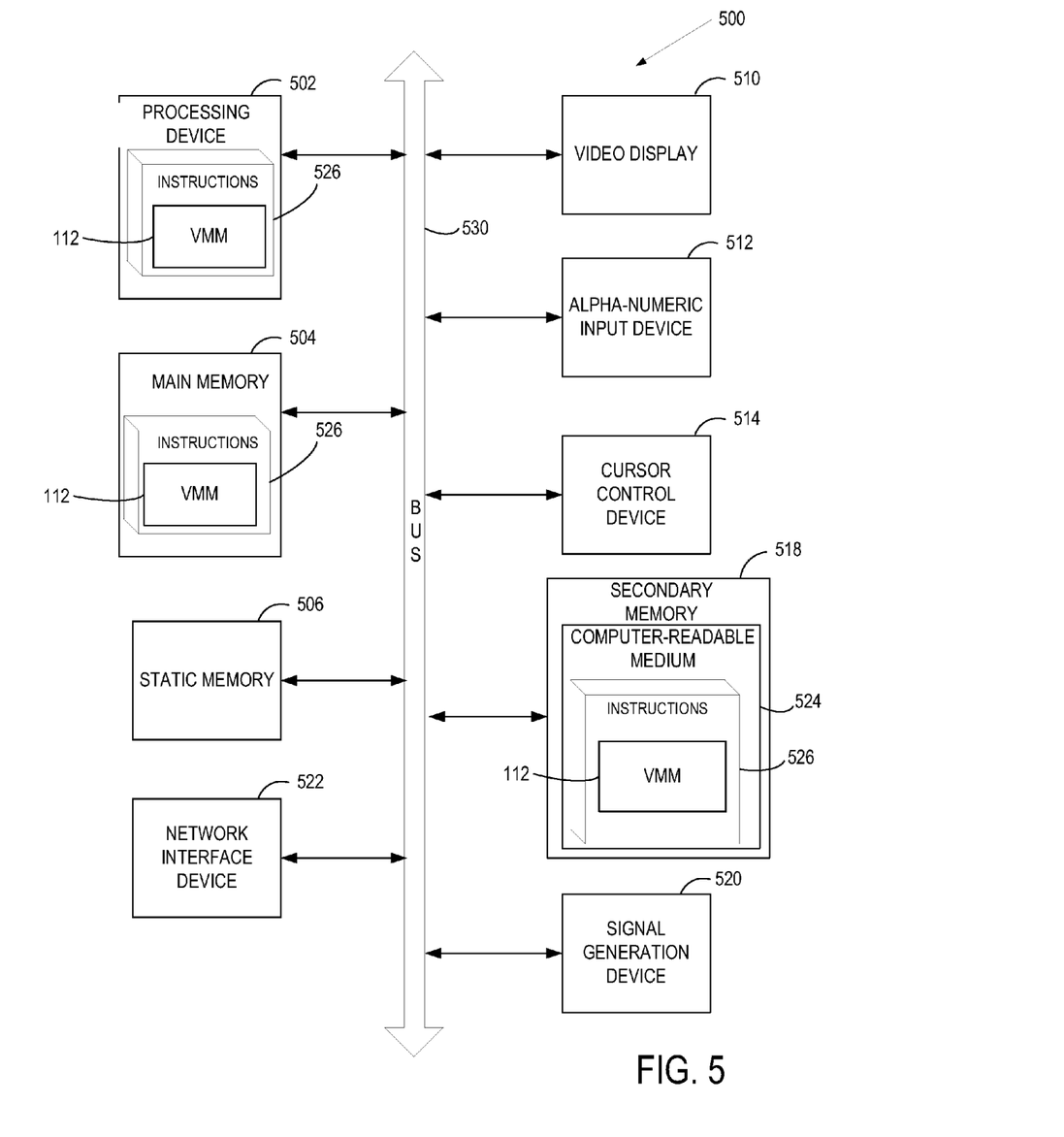
FIG. 5 is a diagram of one embodiment of a computer system for facilitating the execution of emulated printing under embodiments of the present invention.

FIG. 5 is a diagram of one embodiment of a computer system for facilitating the execution of emulated printing. Within the computer system 500 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a secondary memory 518 (e.g., a data storage device in the form of a drive unit, which may include fixed or removable computer-readable storage medium), which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 518 may include a machine-readable storage medium (or more specifically a computer-readable storage medium) 524 on which is stored one or more sets of instructions 526 embodying any one or more of the methodologies or functions described herein. In one embodiment, the instructions 526 include instructions for the VMM 112. The instructions 526 may also reside, completely or at least partially, within the main memory 504 and/or within the processing device 502 during execution thereof by the computer system 500, the main memory 504 and the processing device 502 also constituting machine-readable storage media.

The computer-readable storage medium 524 may also be used to store the instructions 526 persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 526, components and other features described herein can be implemented as discrete hardware components or integrated in the functionality of hardware components such as ASICS, FPGAs, DSPs or similar devices. In addition, the instructions 526 can be implemented as firmware or functional circuitry within hardware devices. Further, the instructions 526 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "establishing," "receiving," "communicating," "identifying," "recording," "storing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

I claim:

1. A method comprising:
   receiving, by a processing device executing a hypervisor, a plurality of parameters associated with an emulated printer at a user interface associated with the hypervisor,
      wherein the plurality of parameters comprise a printer type of a plurality of printer types, a printer implement type of a plurality of printer implement types, a print mechanism of a plurality of print mechanisms and an output type of a plurality of output types,
      wherein the plurality of printer types comprise a manufacturer specific printer model and a generic printer model,
      wherein the plurality of printer implement types comprise character printing, bitmap printing, vector printing and Printer Command Language (PCL) printing, and
      wherein the output type corresponds to a document handling instruction to save a plurality of documents into a single document;
   emulating, by the processing device executing the hypervisor, a physical printer to generate an emulated printer in view of the plurality of parameters, wherein the emulated printer is implemented as a component of the hypervisor;
   presenting, by the hypervisor via a virtual communication channel, the emulated printer to a printer driver of a guest operating system of a virtual machine, wherein the emulated printer is to translate a plurality of first calls from the virtual machine and at least another virtual machine into a plurality of second calls to the physical printer, wherein the virtual communication channel is provided between the emulated printer of the hypervisor and the printer driver, and wherein presenting the emulated printer allows the guest operating system to issue a print job to the emulated printer via the virtual communication channel as if the physical printer were coupled to the virtual machine when the physical printer is physically unavailable to the processing device;
   receiving, by the processing device via the virtual communication channel, the print job from the virtual machine;
   creating, by the processing device executing the emulated printer of the hypervisor, a print image of the print job for the emulated printer, wherein the print image to be provided to the emulated printer comprises the plurality of documents saved into the single document; and
   transmitting, to a storage device associated with the processing device, the print image, wherein the storage device is inaccessible by the virtual machine.

2. The method of claim 1, further comprising:
   initiating transport of the print image to a target destination,
   wherein initiating transport of the print image to the target destination further comprises communicating the print image with at least one of a fax server, an email server, or a storage device.

3. The method of claim 1, further comprising:
   upon creating the print image of the print job, initiating transport of the print image to a destination via an email server, wherein the print image is a file of portable document format (PDF).

4. The method of claim 1, wherein the plurality of output types comprises a type of a target destination.

5. The method of claim 1, wherein the virtual communication channel further comprises at least one of Universal Serial Bus (USB), Ethernet, LPT, RS-232, or EIA-422 bus.

6. A non-transitory computer readable storage medium comprising instructions that, when executed by a processing device, cause the processing device to:
   receive, by the processing device executing a hypervisor, a plurality of parameters associated with an emulated printer at a user interface associated with the hypervisor,
      wherein the plurality of parameters comprise a printer type of a plurality of printer types, a printer implement type of a plurality of printer implement types, a print mechanism of a plurality of print mechanisms and an output type of a plurality of output types,
      wherein the plurality of printer types comprise a manufacturer specific printer model and a generic printer model,
      wherein the plurality of printer implement types comprise character printing, bitmap printing, vector printing and Printer Command Language (PCL) printing, and
      wherein the output type corresponds to a document handling instruction to save a plurality of documents into a single document;
   emulate, by the hypervisor, a physical printer to generate an emulated printer in view of the plurality of parameters, wherein the emulated printer is implemented as a component of the hypervisor;
   present, by the hypervisor via a virtual communication channel, the emulated printer to a guest operating system of a virtual machine, wherein the emulated printer is to translate a plurality of first calls from the virtual machine and at least another virtual machine into a plurality of second calls to the physical printer, wherein the virtual communication channel is provided between the emulated printer of the hypervisor and the printer driver, and wherein presenting the emulated printer allows the guest operating system to issue a print job to the emulated printer via the virtual communication channel as if the physical printer were coupled to the virtual machine when the physical printer is physically unavailable to the processing device;
   receive, by the processing device via the virtual communication channel, the print job from the virtual machine;
   create, by the processing device executing the emulated printer of the hypervisor, a print image of the print job for the emulated printer, wherein the print image to be provided to the emulated printer comprises the plurality of documents saved into the single document; and transmit, to a storage device associated with the processing device, the print image, wherein the storage device is inaccessible by the virtual machine.

7. The computer readable storage medium of claim 6, wherein the processing device is further to:

initiate transport of the print image to a target destination, wherein to initiate the transport of the print image to the target destination, the processing device is further to communicate the print image with at least one of a fax server, an email server, or a storage device.

8. The computer readable storage medium of claim 6, wherein the processing device is further to:

upon creating the print image of the print job, initiate transport of the print image to a destination via an email server, wherein the print image is a file of portable document format (PDF).

9. The computer readable storage medium of claim 8, wherein the plurality of output types comprises a type of a target destination.

10. The computer readable storage medium of claim 6, wherein the virtual communication channel further comprises at least one of Universal Serial Bus (USB), Ethernet, LPT, RS-232, or EIA-422 bus.

11. An apparatus comprising:

a memory; and a processing device, operatively coupled to the memory, to:

receive, by a hypervisor, a plurality of parameters associated with an emulated printer, wherein the plurality of parameters comprise a printer type of a plurality of printer types, a print mechanism of a plurality of print mechanisms and an output type of a plurality of output types, and wherein the output type corresponds to a document handling instruction to save a plurality of documents into a single document;

emulate, by a hypervisor, a physical printer to generate an emulated printer in view of the plurality of parameters, wherein the emulated printer is implemented as a component of the hypervisor;

present, by the hypervisor via a virtual communication channel, the emulated printer to a printer driver of a guest operating system of a virtual machine, wherein the emulated printer is to translate a plurality of first calls from the virtual machine and at least another virtual machine into a plurality of second calls to the physical printer, wherein the virtual communication channel is provided between the emulated printer of the hypervisor and the printer driver, and wherein presenting the emulated printer allows the guest operating system to issue a print job to the emulated printer via the virtual communication channel as if the physical printer were coupled to the virtual machine when the physical printer is physically unavailable to the processing device;

receive, via the virtual communication channel, the print job from the virtual machine;

create, by the emulated printer of the hypervisor, a print image of the print job for the emulated printer, wherein the print image to be provided to the emulated printer comprises the plurality of documents saved into the single document; and transmit, to a storage device associated with the processing device, the print image, wherein the storage device is inaccessible by the virtual machine.

12. The apparatus of claim 11, wherein the processing device is to communicate the print image to a target destination, and wherein the processing device is further to communicate the print image with at least one of a fax server, an email server, or a storage device.

13. The apparatus of claim 11, wherein the processing device is further to:

upon creating the print image of the print job, initiate transport of the print image to a destination via an email server, wherein the print image is a file of portable document format (PDF).

14. The apparatus of claim 13, wherein the plurality of output types comprises a type of a target destination.

* * * * *